United States Patent
Abeyasekera et al.

(10) Patent No.: US 11,028,831 B2
(45) Date of Patent: Jun. 8, 2021

(54) CONTROLLING POWER EXCHANGE FROM SELF-COMMUTATED CONVERTERS

(71) Applicant: MHI Vestas Offshore Wind A/S, Aarhus N (DK)

(72) Inventors: Tusitha Abeyasekera, Århus N (DK); Salvador Año-Villalba, Alboraya (ES); Soledad Bernal Pérez, Alboraya (ES); Ramon Blasco-Gimenez, Burjassot (ES)

(73) Assignee: MHI VESTAS OFFSHORE WIND A/S, Aarhus N (DK)

( * ) Notice: Subject to any disclaimer, the term of this patent is extended or adjusted under 35 U.S.C. 154(b) by 0 days.

(21) Appl. No.: 16/345,419

(22) PCT Filed: Oct. 26, 2017

(86) PCT No.: PCT/EP2017/077480
§ 371 (c)(1),
(2) Date: Apr. 26, 2019

(87) PCT Pub. No.: WO2018/078032
PCT Pub. Date: May 3, 2018

(65) Prior Publication Data
US 2019/0309728 A1    Oct. 10, 2019

(30) Foreign Application Priority Data

Oct. 26, 2016 (EP) .................................. 16382489

(51) Int. Cl.
*F03D 9/25* (2016.01)
*F03D 7/04* (2006.01)
*H02J 3/38* (2006.01)

(52) U.S. Cl.
CPC .............. *F03D 9/257* (2017.02); *F03D 7/047* (2013.01); *H02J 3/386* (2013.01); *H02J 3/388* (2020.01); *Y02E 10/72* (2013.01); *Y02E 10/76* (2013.01)

(58) Field of Classification Search
CPC .......... F03D 9/257; F03D 7/047; H02J 3/386; H02J 3/388; Y02E 10/72; Y02E 10/76
See application file for complete search history.

(56) References Cited

U.S. PATENT DOCUMENTS 8,841,796 B2 * 9/2014 Rosenvard .............. F03D 7/048
                                                        307/11
9,859,708 B2 * 1/2018 Buhl ....................... H02J 3/387
(Continued)

FOREIGN PATENT DOCUMENTS

| EP | 2236821 A1 | 10/2010 |
|---|---|---|
| EP | 2565443 A1 | 3/2013 |
| WO | 2018078032 A1 | 5/2018 |

OTHER PUBLICATIONS

European Search Report in related applicaiton EP 16382489 dated Apr. 28, 2017.
(Continued)

*Primary Examiner* — Sean Gugger
(74) *Attorney, Agent, or Firm* — Patterson + Sheridan, LLP

(57) ABSTRACT

Embodiments herein describe operating a control system for a wind turbine in a first mode and second mode of operation. When in the first mode, the wind turbine provides power to a local AC grid. However, when in the second mode, the wind turbine provides power to a high-voltage direct current (HVDC) link. The control system includes a reactive power control leg and an active power control leg. To switch from the first mode to the second mode, the control system activates a PI controller coupled between the reactive and (Continued)

active power control legs which increases the output voltage of the wind turbine until the magnitude of the voltage activates a diode rectifier and permits the power outputted by the wind turbine to be transmitted along the HVDC link.

20 Claims, 10 Drawing Sheets

(56) References Cited

U.S. PATENT DOCUMENTS

| | | | |
|---|---|---|---|
| 2010/0060000 A1* | 3/2010 | Scholte-Wassink | ........................ F03D 7/0284 290/44 |
| 2010/0091417 A1* | 4/2010 | Letas | ...................... H02H 9/041 361/21 |
| 2010/0157632 A1* | 6/2010 | Batten | ...................... H02J 3/386 363/74 |
| 2012/0146423 A1* | 6/2012 | Bodewes | ................. F03D 9/257 307/84 |
| 2013/0300116 A1 | 11/2013 | Egedal et al. | |
| 2014/0008912 A1* | 1/2014 | Gupta | ...................... F03D 9/255 290/44 |
| 2014/0225369 A1* | 8/2014 | Bodewes | ................... F03D 7/04 290/44 |
| 2017/0009745 A1* | 1/2017 | Brogan | ...................... H02P 9/48 |

OTHER PUBLICATIONS

International Search Report and Written Opinion in related application PCT/EP2017077480 dated May 2, 2018.

* cited by examiner

CONTROLLING POWER EXCHANGE FROM SELF-COMMUTATED CONVERTERS

BACKGROUND

Field of the Invention

Embodiments presented in this disclosure generally relate to transmitting wind turbine power on a high-voltage direct current (HVDC) link, and more specifically, to selectively activating a controller with an integral action to switch between a first mode where wind power is generated for a local AC grid, and a second mode where wind power is, via the local AC grid, transmitted on the HVDC link.

Description of the Related Art

Off-shore wind turbines are desired in many situations instead of on-shore wind turbines since stronger wind speeds are typically available offshore when compared to land. Moreover, offshore wind turbines are not obstructed by trees, hills, buildings, etc. To couple the offshore wind turbines to an onshore grid (which may be located tens or hundreds of kilometers away), a wind turbine operator may use a HVDC link instead of transmitting AC signals which may improve transmission efficiency. For underwater power cables, HVDC avoids the heavy currents required to charge and discharge the cable capacitance each cycle. However, the circuitry required to couple the wind turbines to a HVDC link is expensive.

SUMMARY

One embodiment of the present disclosure is a method that includes operating a wind turbine in a first mode to provide power to a local AC grid using a control system where the control system comprises a reactive power control leg and an active power control leg. The method also includes switching from the first mode to a second mode by activating a controller with an integral action coupled between the reactive power control leg and the active power control leg, where, when in the second mode, the wind turbine transmits power to a high-voltage direct current (HVDC) link, and where the wind turbine, via the local AC grid, is coupled to the HVDC link using a diode rectifier.

Another embodiment described herein is a wind turbine that includes a control system that includes a reactive power control leg, an active power control leg, and a controller with an integral action selectively coupled between the reactive power control leg and the active power control leg. The control system is configured to operate the wind turbine in a first mode to provide power to a local AC grid and switch from the first mode to a second mode by activating the controller, where, when in the second mode, the wind turbine, via the local AC grid, transmits power to a HVDC link, where the wind turbine is coupled to the HVDC link using a diode rectifier.

Another embodiment described herein is a control system for a wind turbine that includes a processor and a memory configured to store a program, which when executed by the processor performs an operation, the operation includes operating a wind turbine in a first mode to provide power to a local AC grid using a control system where the control system comprises a reactive power control leg and an active power control leg and switching from the first mode to a second mode by activating a controller with an integral action coupled between the reactive power control leg and the active power control leg, wherein, when in the second mode, the wind turbine, via the local Ac grid, transmits power to a HVDC link, where the wind turbine is coupled to the HVDC link using a diode rectifier.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

An uncontrolled diode rectifier provides an alternative to conventional circuits for coupling wind turbines in a wind park to a HVDC link. However, the control systems in the wind turbines may need to be modified so that the wind turbines can generate sufficient power to activate the diodes in the rectifier and transmit power along the HVDC link. In one embodiment, instead of using a central control system, each wind turbine has an individual control system which operates in two modes: an island mode and a high-power mode. The island mode is used when the wind turbine is not transmitting power on the HVDC link. For example, in the island mode, the wind turbines may not generate sufficient power to activate the diode rectifier. Instead, the island mode permits the wind turbines in the park to generate power for auxiliary control such as yawing the turbines or running pumps in the turbines. In another example, the wind turbines may be coupled to a local AC grid and can use the island mode to output power to the local grid. In the high-power mode, the control systems in the wind turbines increase the output power to the local AC grid until the diode rectifier is activated thereby transmitting the power generated by the wind turbines on the HVDC link, wherein the local AC grid is connected to the HVDC link via the diode rectifier. In this mode, the control systems can set the desired output power of the wind turbines (including power curtailment).

In one embodiment, to switch between the island and high-power modes, a wind turbine activates a proportional-integral (PI) controller that is coupled between a reactive power control leg and an active power control leg in its control system. The PI controller receives as an input the difference between a desired active power value and the actual active power value generated by wind turbine and outputs a corresponding voltage adjustment. This voltage adjustment is then used in the reactive power control leg to change the magnitude of a voltage value. In one embodiment, when switching from the island mode to the high-power mode, the wind turbine activates the PI controller which increases the output of the wind turbine until the average AC voltage across the diodes rectifier exceeds the cut in voltage of the diodes and permits the wind turbine, via the local AC grid, to transmit power on the HVDC link.

EXAMPLE EMBODIMENTS

Figure 1:
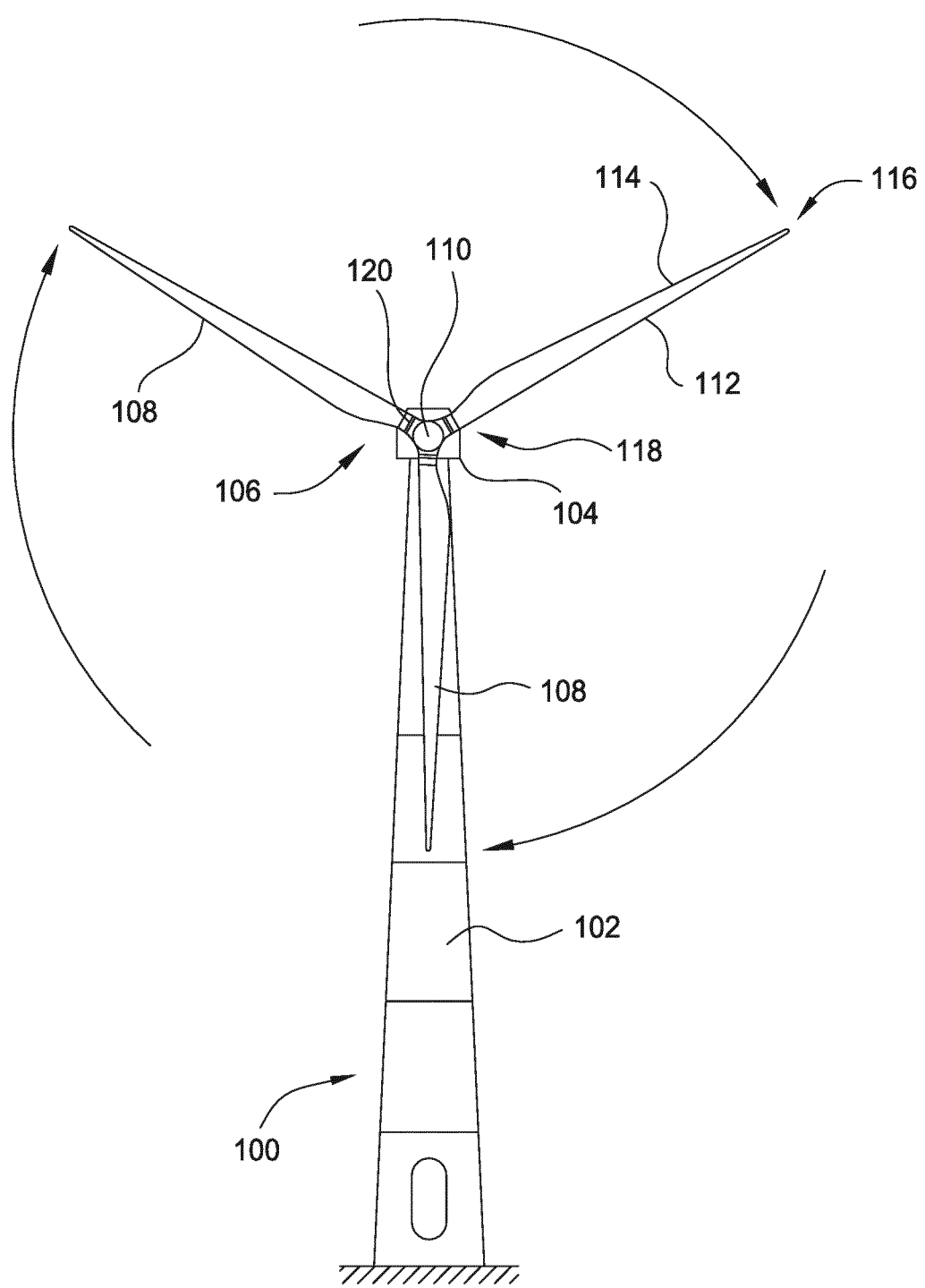
FIG. 1 illustrates a diagrammatic view of a wind turbine, according to an embodiment described in this present disclosure.

FIG. 1 illustrates a diagrammatic view of a horizontal-axis wind turbine generator 100. The wind turbine generator 100 typically comprises a tower 102 and a wind turbine nacelle 104 located at the top of the tower 102. A wind turbine rotor 106 may be connected with the nacelle 104 through a low speed shaft extending out of the nacelle 104. The wind turbine rotor 106 comprises three rotor blades 108 mounted on a common hub 110 which rotate in a rotor plane, but may comprise any suitable number of blades, such as one, two, four, five, or more blades. The blades 108 (or airfoil) typically each have an aerodynamic shape with a leading edge 112 for facing into the wind, a trailing edge 114 at the opposite end of a chord for the blades 108, a tip 116, and a root 118 for attaching to the hub 110 in any suitable manner.

For some embodiments, the blades 108 may be connected to the hub 110 using pitch bearings 120 such that each blade 108 may be rotated around its longitudinal axis to adjust the blade's pitch. The pitch angle of a blade 108 relative to the rotor plane may be controlled by linear actuators, hydraulic actuators, or stepper motors, for example, connected between the hub 110 and the blades 108.

Figure 2:
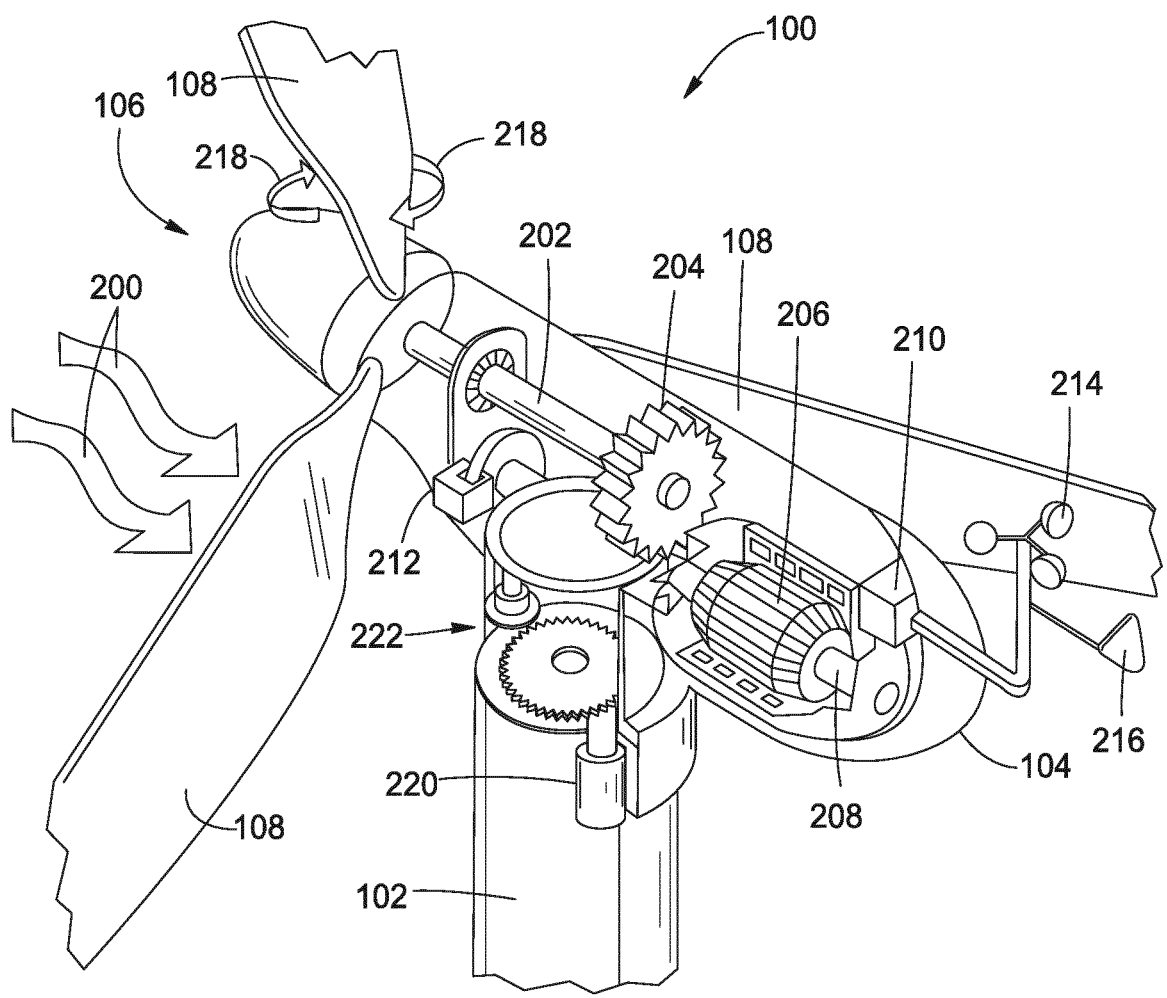
FIG. 2 illustrates a diagrammatic view of the components internal to the nacelle and tower of a wind turbine, according to an embodiment described in this present disclosure.

FIG. 2 illustrates a diagrammatic view of typical components internal to the nacelle 104 and tower 102 of a wind turbine generator 100. When the wind 200 pushes on the blades 108, the rotor 106 spins and rotates a low-speed shaft 202. Gears in a gearbox 204 mechanically convert the low rotational speed of the low-speed shaft 202 into a relatively high rotational speed of a high-speed shaft 208 suitable for generating electricity using a generator 206.

A controller 210 may sense the rotational speed of one or both of the shafts 202, 208. If the controller decides that the shaft(s) are rotating too fast, the controller may signal a braking system 212 to slow the rotation of the shafts, which slows the rotation of the rotor 106—i.e., reduces the revolutions per minute (RPM). The braking system 212 may prevent damage to the components of the wind turbine generator 100. The controller 210 may also receive inputs from an anemometer 214 (providing wind speed) and/or a wind vane 216 (providing wind direction). Based on information received, the controller 210 may send a control signal to one or more of the blades 108 in an effort to adjust the pitch 218 of the blades. By adjusting the pitch 218 of the blades with respect to the wind direction, the rotational speed of the rotor (and therefore, the shafts 202, 208) may be increased or decreased. Based on the wind direction, for example, the controller 210 may send a control signal to an assembly comprising a yaw motor 220 and a yaw drive 222 to rotate the nacelle 104 with respect to the tower 102, such that the rotor 106 may be positioned to face more (or, in certain circumstances, less) upwind.

Figure 3:
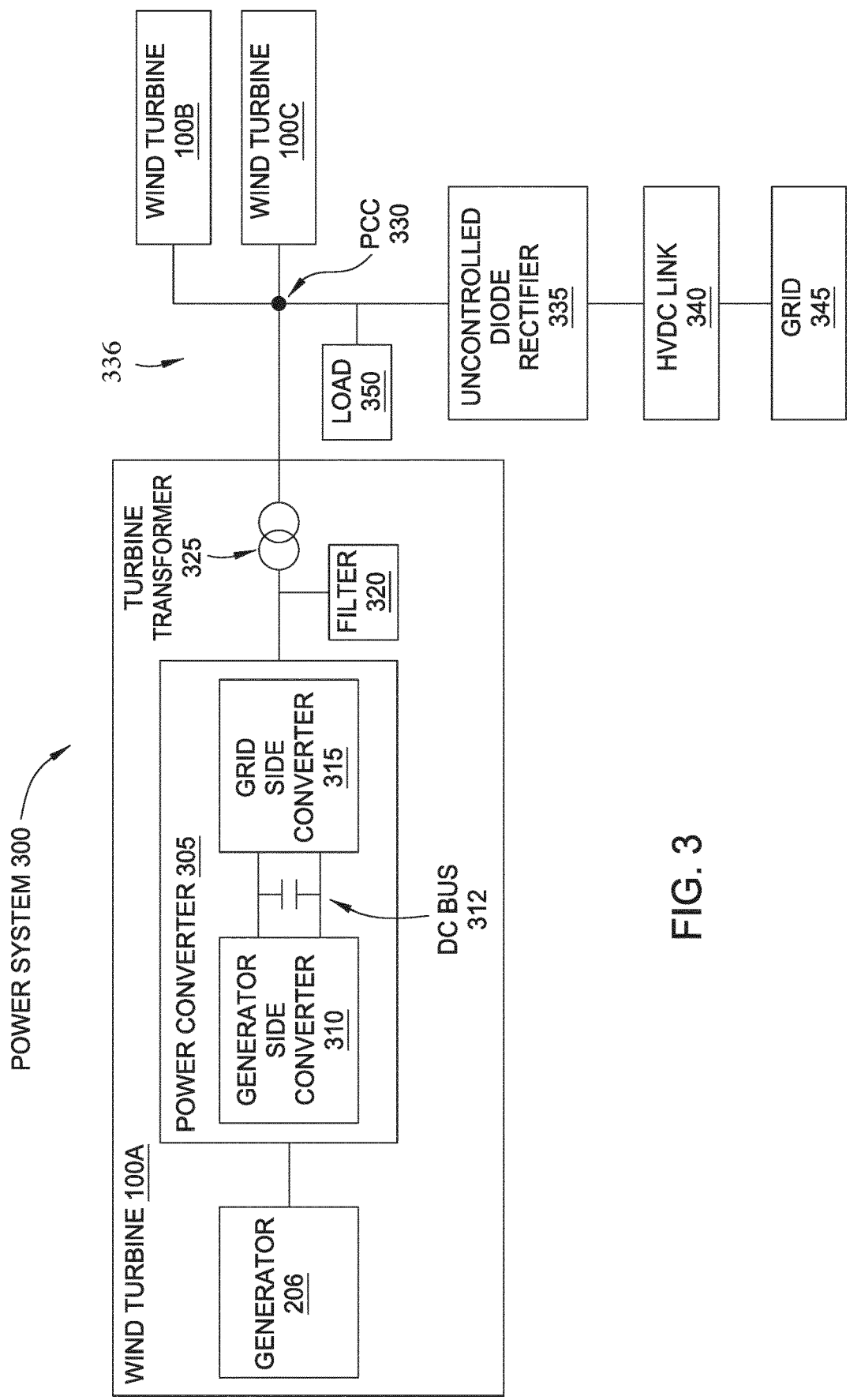
FIG. 3 is a block diagram of a power system according to an embodiment described in this present disclosure.

FIG. 3 is a block diagram of a power system 300 according to an embodiment described in this present disclosure. The power system 300 includes wind turbines 100A-100C coupled to an uncontrolled diode rectifier 335 at a point of common coupling (PCC) 330. The rectifier 335 is in turn coupled to a HVDC link 340 which transmits the power generated by the wind turbines 100 to a grid 345. In one embodiment, the wind turbines 100 are located in an offshore wind park while the grid 345 is an onshore electrical grid. However, in other embodiments, both the wind park and the grid 345 may be onshore.

The wind turbine 100A includes a generator 206 for generating AC power, a power converter 305 for converting the AC signals provided by the generator 206 into a desired frequency, and a filter 320 for removing noise and harmonics from the output of the converter 305. As shown, the power converter 305 includes a generator-side converter 310 and a grid side converter 315 coupled together via a DC bus 312. In one embodiment, the generator-side converter 310 includes a plurality of switches (e.g., power transistors) which convert the AC signals provided by the generator 206 into DC power that is transmitted on the DC bus 312. The grid side converter 315 receives the DC power and uses switches to convert the DC power back into an AC power (e.g., three-phase AC power) with a desired frequency (e.g., 50 Hz or 60 Hz). Although not shown, the wind turbines 100B and 100C may have a similar arrangement as the wind turbine 100A.

The wind turbine 100A includes a turbine transformer 325 that couples the turbine 100A to the PCC 330. In one embodiment, the grid transformer 325 is within the turbine 100A—e.g., within the tower. Moreover, although not shown, the wind turbines 100B and 100C can also be coupled to the PCC 330 using respective turbine transformers.

The outputs of the turbine transformers form a local AC grid 336. Thus, the grid connecting the turbines 100A-100C can be understood as a local AC grid 336. The PPC 330 is comprised in the local AC grid 336. As described in more detail below, in a first mode of operation (e.g., the island mode), one or more of the wind turbines 100 provides power to a load 350 couple to the local AC grid 336. For example, although the wind turbines 100 can be located offshore, the turbines 100 can be coupled to a local load 350 such as a nearby populated land mass. Thus, even when the wind turbines 100 are not transmitting power on the HVDC link 340 to the grid 345, the wind turbines 100 can be supply power to the local load 350. Furthermore, when in the island mode, one or more of the wind turbines 100 can supply auxiliary power for the remaining turbines 100 in the park. For example, a few of the wind turbines 100 can still generate power using the island mode of operation to provide auxiliary power to yaw the remaining turbines 100 or run pumps in the turbines 100. This avoids having to have alternative power supplies (e.g., diesel generators) in an offshore wind park to provide auxiliary power when the wind turbines are not transmitting power on the HVDC link 340.

To transmit power to the grid 345 via the HVDC link 340, the wind turbines 100 switch to a second mode of operation (e.g., the high-power mode) to increase their combined power output at the PCC 330 to exceed the cut in voltage of the diodes in the uncontrolled diode rectifier 335. Doing so energizes the HVDC link 340 and transmits power to the grid 345.

Figure 4:
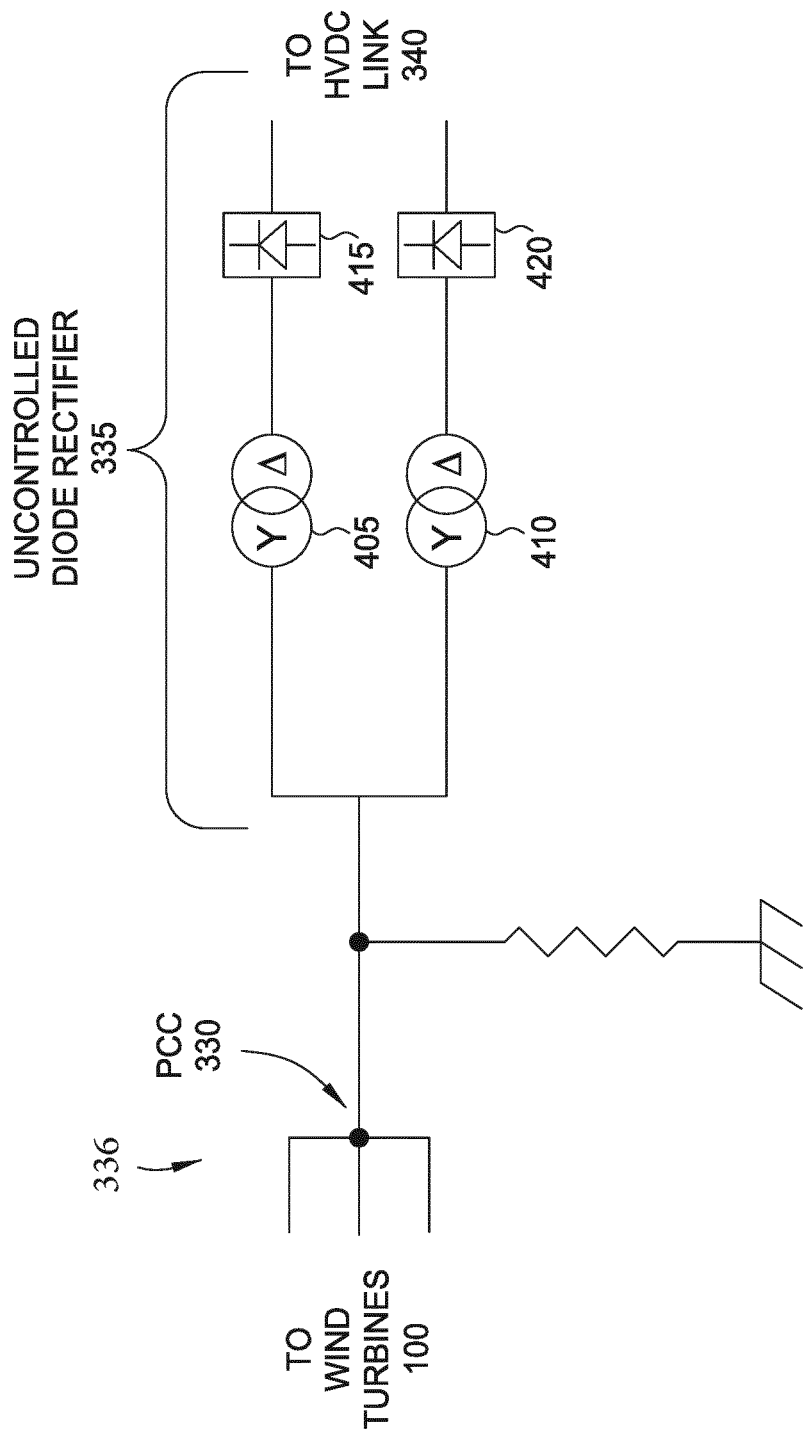
FIG. 4 illustrates an uncontrolled diode rectifier coupled to a HVDC link according to an embodiment described in this present disclosure.

FIG. 4 illustrates the uncontrolled diode rectifier 335 coupled to the HVDC link 340 according to embodiments described in this present disclosure. The diode rectifier 335 shown in FIG. 4 is just one suitable arrangement of a rectifier that can be used with the control system described herein. Other types or arrangements of diode rectifiers 335 can be used. For example, while FIG. 4 illustrates a 12-pulse rectifier 335, the rectifier 335 may include a different number of pulses. In one embodiment, the diode rectifier 335 is "uncontrolled" because no control signals are needed or used to operate the diode rectifier 335. As such, the diode rectifier 335 can include only passive components that do not need digital or analog control signals to operate.

As shown, the diode rectifier 335 includes a first transformer 405 and a second transformer 410 coupled to the PCC 330. The first transformer 405 is a Y-delta transformer, while the second transformer 410 is a Y-Y transformer. Further, the rectifier 335 includes a first diode 415 and a second diode 420. Generally, the transformers and diodes in the rectifier 335 convert the AC power signal, in the local AC grid 336, provided by the wind turbines at the PCC 330 to DC power signals that are transmitted on the HVDC link 340.

Figure 5:
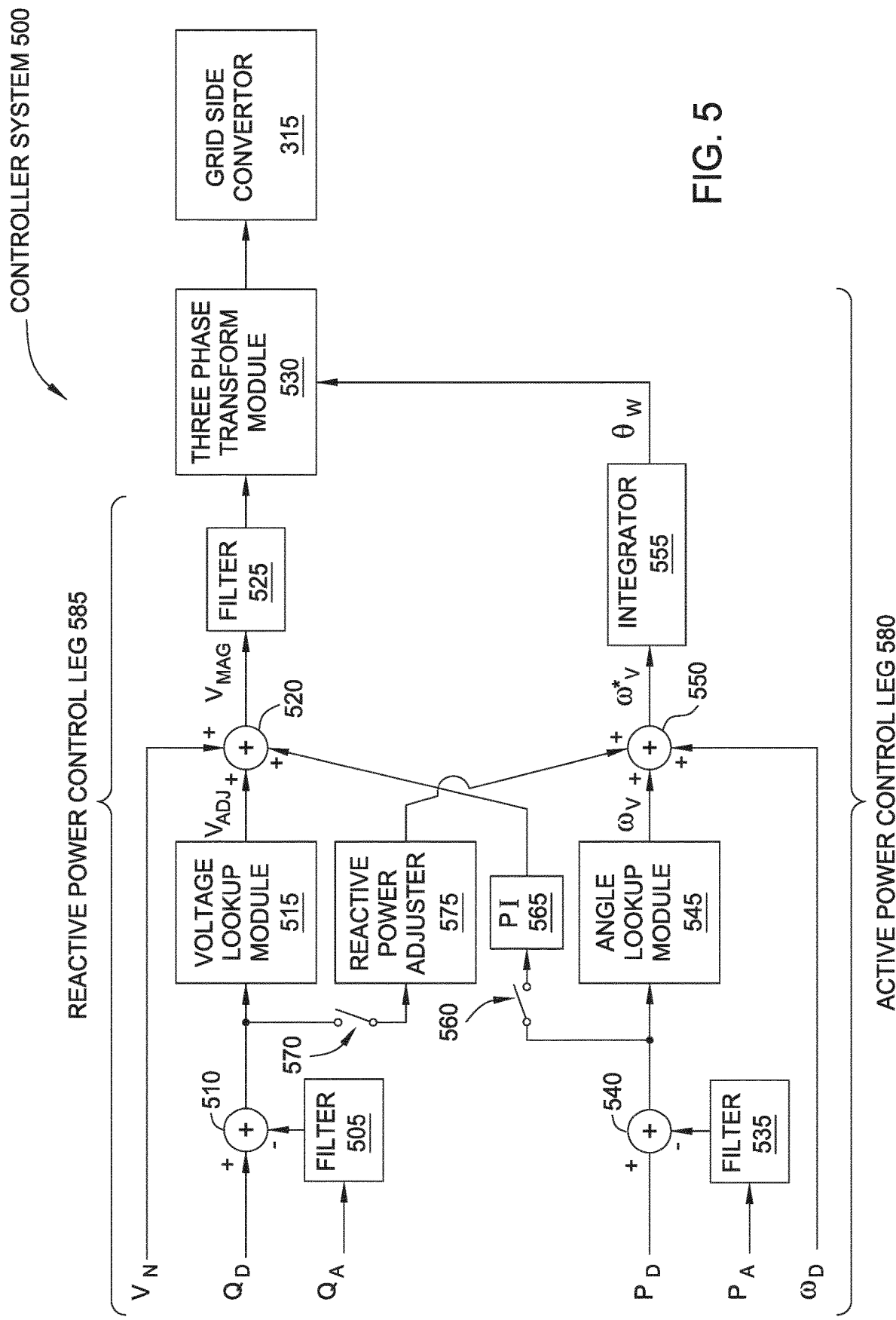
FIG. 5 illustrates a control system of a wind turbine generator according to an embodiment described in this present disclosure.

FIG. 5 illustrates a control system 500 of a wind turbine according to an embodiment described in this present disclosure. In one embodiment, each wind turbine in a wind park includes a copy of the control system 500. The control system 500 may be performed by a wind turbine controller and may be implement using solely software, solely hardware, or some mixture of software and hardware elements. In one embodiment, the control system 500 is implemented using a computing system that includes one or more processors and memory.

One advantage of the control system 500 is that there does not need to be high speed data communication between the control systems 500 in the individual wind turbines. That is, the control systems 500 in the individual wind turbines do not need to be synchronized during operation, although the individual control systems 500 may receive reference set points from a central wind park controller. By not requiring communication between the different control systems 500, the reliability of the control system 500 is increased. Moreover, the control system 500 does not need a phase locked loop (PLL) for operation unlike systems that require communication between the control systems in the wind turbines.

The control system 500 has a reactive power control leg 585 and an active power control leg 580. The reactive power control leg 585 receives a desired reactive power value $Q_D$ from the wind park controller and an actual reactive power value $Q_A$ which represents the current reactive power being generated at the output of the grid side converter 315. The actual reactive power value $Q_A$ is passed through an optional filter 505 and is provided to a first adder 510 along with the desired reactive power value $Q_D$. The first adder 510 determines the difference between the desired reactive power value $Q_D$ (i.e., the reactive power the wind park controller wants the wind turbine to output) and the actual reactive power $Q_A$ currently outputted from the wind turbine. This difference is inputted to a voltage lookup module 515 which outputs a voltage adjustment value $V_{ADJ}$ used for adjusting the output voltage of the wind turbine. In one embodiment, the voltage lookup module includes a plurality of incremental voltage values that are mapped to respective differences between the desired and actual reactive power values. The plurality of voltage values for each control system 500 in the various wind turbines may be different, or the same, voltage values. That is, the voltage values for the voltage lookup module 515 in one wind turbine may be different than the voltage values in a second wind turbine.

A second adder 520 adds the voltage adjustment value $V_{ADJ}$ to a nominal voltage $V_N$ (which may be provided by the wind park controller) to output a magnitude voltage $V_{MAG}$. The second adder 520 is also coupled to a PI controller 565 which will be described later. The magnitude voltage $V_{MAG}$ is passed through an optional filter 525 and to a three-phase transform module 530. Generally, the three-phase transform module 530 converts the magnitude voltage $V_{MAG}$ and a voltage factor angle $\theta_W$ outputted by the active power control leg 580 to control signals for the grid side converter 315. Put differently, the transform module 530 uses the outputs of the reactive and active power control legs 580 and 585 to generate control signals that operate the switches (e.g., power transistors) in the grid side converter 315 to output corresponding three-phase AC voltage signals.

In the active power control leg 580, the control system 500 receives a desired active power value $P_D$ from the wind park controller and an actual active power value $P_A$ which represents the current active power outputted by the grid side converter 315. The actual active power value $P_A$ is passed through an optional filter 535. A third adder 540 compares the desired active power value $P_D$ to the actual active power value $P_A$ and outputs a difference of the two. This difference is provided to an angle lookup module 545 which outputs a corresponding angle adjustment $\omega_V$. The angle lookup module 545 may include a plurality of incremental angle adjustment values that correspond to respective differences between the actual and desired active power values $P_A$ and $P_D$. The angle adjustment values stored in the angle lookup module 545 can be the same, or different, for the different wind turbines in the park.

The angle adjustment $\omega_V$ outputted by the angle lookup module 545 is passed to a fourth adder 550 which combines the angle adjustment $\omega_V$ with a desired angle $\omega_D$ received from the wind park controller. While the magnitude voltage $V_{MAG}$ outputted by the reactive power control leg 585 controls the magnitude of the AC signal generated by the grid side converter 315, the angles $\omega_V$ and $\omega_D$ control the frequency of the AC signals. For example, the desired angle $\omega_D$ may represent the desired frequency of the local AC grid 336 (e.g., 50 Hz). The control system 500 uses the angle adjustment $\omega_V$ to increase or decrease the active power generated by the grid side converter to match the desired active power value $P_D$.

The fourth adder 550 outputs a combined angle $\omega_V^*$ to an integrator 555 which outputs the voltage factor angle $\theta_W$. The voltage factor angle $\theta_W$ along with the magnitude voltage $V_{MAG}$ are used by the three-phase transform module 530 to generated control signals that set the magnitude and frequency of a three-phase AC signal outputted by the grid side converter 315.

The control system 500 also includes a switch 560 that selectively couples the PI controller 565 to the output of the third adder 540 and a switch 570 which selectively couples a reactive power adjustor 575 to the output of the first adder 510. When operating in the island mode, the switches 560 and 570 are open thereby deactivating the PI controller 565 and the reactive power adjustor 575 such that these components do not affect the voltage factor angle $\theta_V$ and the magnitude voltage $V_{MAG}$ generated by the reactive and active power control legs 580 and 585. However, even when the PI controller 565 and reactive power adjustor 575 are deactivated, the control system 500 can still generate AC signals for powering a local load coupled to the local AC grid 336. As mentioned above, in the island mode, the grid side converter 315 may output AC power for a nearby populated land mass that is connected to the local AC grid 336. Additionally or alternatively, one or more of the wind turbines in the park may generate auxiliary power for the remaining wind turbines in the park. That is, some of the wind turbines may be shut down (i.e., not generating power) while other wind turbines operate in the island mode as shown in FIG. 5 to provide auxiliary power for the shutdown turbines.

In one embodiment, when operating in the island mode, the control system 500 may not be able to set the actual power outputted to the wind turbine (i.e., the actual reactive and active power values $Q_A$ and $P_A$) to desired power values (i.e., the desired reactive and active power values $Q_D$ and $P_D$). Instead, the actual power outputted by the wind turbine is dictated by the local load on the turbine.

To switch from the island mode to the high-power mode, the control system 500 closes the switches 560 and 570 thereby connecting the inputs of the PI controller 565 and the reactive power adjustor 575 to the active power control leg 580 and reactive power control leg 585, respectively. Although the control system 500 illustrates switches to connect the inputs of the PI controller 565 and the reactive power adjustor 575 to the respective legs 580 and 585, other activation means may be used such as turning on and off the power delivered to the PI controller 565 and reactive power adjustor 575.

Figure 6:
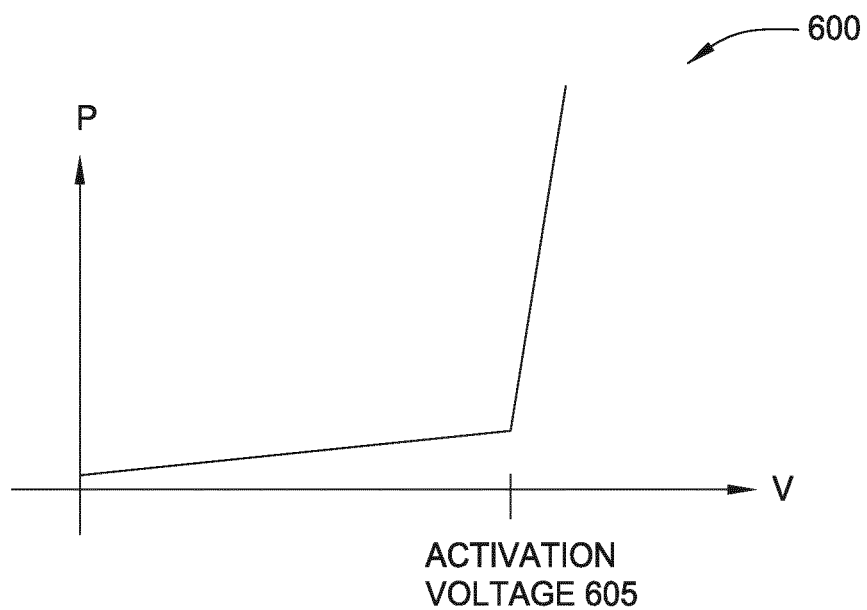
FIG. 6 is a graph illustrating an activation voltage of the diode rectifier according to an embodiment described in this present disclosure.

When switch 560 is closed, the PI controller 565 receives from the third adder 540 the difference between the desired active power value $P_D$ and the actual active power value $P_A$. Although a PI controller is shown, any controller with an integral action can be used such as the PI controller 565 or a proportion-integral-derivative (PID) controller. The PI controller 565 outputs an adjustment voltage which is added to the magnitude voltage $V_{MAG}$ until the actual active power value $P_A$ matches the desired active power value $P_D$. In one embodiment, the PI controller 565 causes the reactive power control leg 585 to increase the magnitude of the AC signals generated by the grid side converter 315 until this magnitude exceeds the cut in voltage of the diodes in the uncontrolled diode rectifier. This is shown in FIG. 6 where a graph 600 illustrates an activation voltage of the diode rectifier according to an embodiment described in this present disclosure. The graph 600 illustrates the power flowing through the diode rectifier on the y-axis and the voltage across the diodes in the x-axis. As the PI controller 565 increases the magnitude of the AC signals generated by the wind turbine, the average voltage across the diodes eventually reach the activation voltage 605 (i.e., the diode cut in voltage) which activates the diode rectifier and permits power to be transmitted onto the HVDC link. Once activated, the control system 500 can continue to use the PI controller 565 to control the output power of the wind turbine as dictated by the wind park controller. That is, unlike when in the island mode, in the high-power mode, the control system 500 can control the output power to match the desired power (after the activation voltage 605 has been reached). For example, if the wind park controller sends a new desired active power value $P_D$, the PI controller 565 can adjust the magnitude of the AC signals to output the desired active power.

In addition to activating the PI controller 565 when operating in the high-power mode, the control system 500 also activates the reactive power adjustor 575 by closing the switch 570. Generally, the reactive power adjustor 575 prevents the formation of a circulating reactive power between the wind turbines coupled to the PCC. Because there are an infinite number of solutions depending on how much reactive power each turbine is producing, this can result in circulating reactive power. When the switch 570 is closed, the difference (or error) between the desired reactive power value $Q_D$ and the actual reactive power value $Q_A$ outputted by the adder 510 is transmitted to the reactive power adjustor 575. In turn, the reactive power adjustor 575 outputs an angle value that is sent to the adder 550. That is, the angle value is added to the angle adjustment $\omega_V$ and the desired angle $\omega_D$ to generate the combined angle voltage factor angle $\omega_V^*$. A large difference between the desired reactive power value $Q_D$ and the actual reactive power value $Q_A$ means the wind turbine is generating too much reactive power. Thus, the angle value generated by the reactive power adjustor 575 causes the control system 500 to reduce the reactive power being outputted by the grid side converter 315. Conversely, a small difference between the desired reactive power value $Q_D$ and the actual reactive power value $Q_A$ means the wind turbine is generating too little reactive power. In response, the reactive power adjustor 575 increases the reactive power generated by the turbine. If each control system 500 in the wind turbines includes the reactive power adjustor 575, this results in the wind turbines sharing the generation of the reactive current amongst themselves and mitigates the likelihood of a circulating reactive current.

In one embodiment, the control system 500 receives a prompt to switch from the high-power mode to the island mode when, for example, the HVDC link breaks or is otherwise inoperable. For example, each control system 500 for the wind turbines may receive a command from the wind park controller to switch to the island mode of operation. In response, the control systems 500 open the switches 560 and 570 which deactivate the PI controller 565 and the reactive power adjustor 575. In this manner, the control system 500 can switch between the island mode and the high-power mode of operation.

Figure 7:
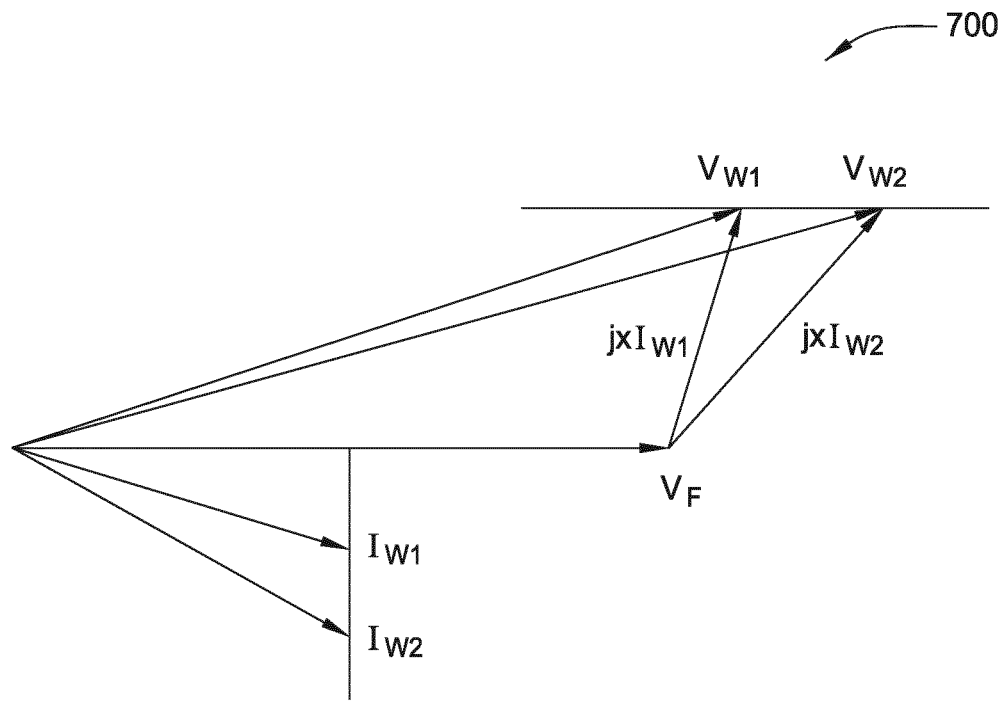
FIG. 7 is a vector diagram according to an embodiment described in this present disclosure.

FIG. 7 is a vector diagram according to an embodiment described in this present disclosure. The vector $V_F$ illustrates the common voltage at the diode rectifier while the vectors $V_{W1}$, $V_{W2}$, $I_{W1}$, and $I_{W2}$ represent respective voltages and currents for two wind turbines in the park—i.e., Wind Turbine 1 (W1) and Wind Turbine 2 (W2). The two current vectors $I_{W1}$ and $I_{W2}$ illustrate that the two wind turbines generate different reactive power. Specifically, Wind Turbine 2 delivers more reactive power than Wind Turbine 1 which means the voltage vector $V_{W2}$ is too large. Stated differently, the angle between the vector $V_F$ and $V_{W2}$ is not optimal. As described above in FIG. 5, the control system 500 includes the reactive power adjustor 575 which can adjust the outputs of the Wind Turbine 2 such that the angle between $V_F$ and $V_{W2}$ is closer to the angle between $V_F$ and $V_{W1}$. As a result, the reactive power output is shared more equally by the wind turbines which can prevent circulating reactive current between the wind turbines.

Figure 8:
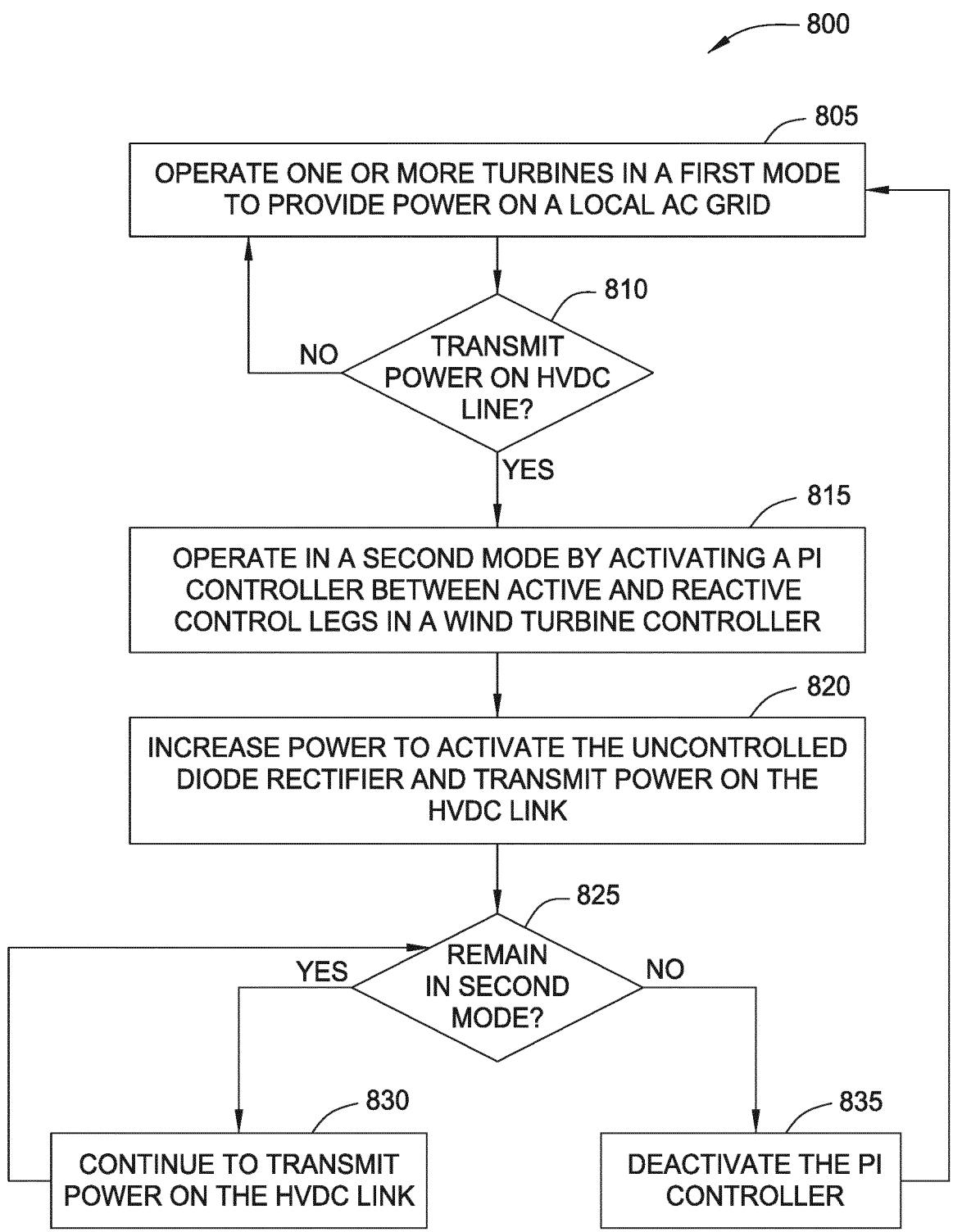
FIG. 8 is a flow chart for operating a wind turbine in different modes according to an embodiment described in this present disclosure.

FIG. 8 is a flow chart of a method 800 for operating a wind turbine in different modes according to an embodiment described in this present disclosure. At block 805, a wind park controller instructs a control system in a wind turbine to operate in a first mode to provide power to a local AC grid 336. In one embodiment, the wind park controller instructs a subset of the wind turbines to operate in the first mode (i.e., the island mode). For example, only a few of the turbines in the park may be operated in the island mode to generate auxiliary power for the remaining turbines which do not generate any power. Alternatively, all of the turbines in the park may be operated in the island mode to provide power to the local AC grid 336 which may, for example, include a near-by populated land mass such as an island.

If at block 810 the wind park controller determines not to transmit power on a HVDC link, method 800 returns to block 805 where at least one wind turbine continues to operate in the island mode. Otherwise, method 800 proceeds to block 815 where the wind park controller instructs at least one of the wind turbines to operate in the second mode by activating a PI controller between the active and reactive control legs in a wind turbine controller (e.g., control system 500 in FIG. 5). In one embodiment, the PI controller uses the difference (or error) between actual and desired reactive power values determined in the reactive control leg of the wind turbine controller to generate a voltage adjustment used in the active control leg of the turbine controller. The voltage adjustment increases the magnitude of the AC voltage generated by the wind turbine to activate the diodes in the rectifier so that power is conducted on the HVDC link.

In one embodiment, when the diode rectifier is active and the HVDC link transmits power, a wind turbine currently not transmitting power is synchronized to the wind turbines that are transmitting power on the HVDC link before coupling the wind turbine to the PCC. For example, when electrically coupling a new wind turbine to the PCC, if the angle ω in the control system of the new turbine is not synchronized, coupling the new wind turbine to the wind turbines already generating power can create a short circuit. Thus, before adding the new turbine, its control system may synchronize its value of the angle ω to the same angle value used in the control systems of the wind turbines already transmitting power on the HVDC link. Referring to FIG. 5, in one embodiment, the initial value for the integrator 555 of the new turbine is derived by measuring the phase of the voltage on the low side of the local AC grid 336. By initializing the integrator 555 to the initial value, the new turbine has the same angle as the currently connected wind turbines, and thus, when the new turbine is coupled to the PCC, the power at the PCC is increased and a short circuit is avoided. This synchronization process can be repeated to couple additional wind turbines to the PCC and the HVDC link.

At block 820, the PI controller in the control system increases power generated by the wind turbine to activate the uncontrolled diode rectifier and transmit power on the HVDC link. As shown in FIG. 6, the PI controller can increase the magnitude of the voltage across the diodes in the rectifier until the diodes are activated and power is transmitted on the HVDC link. Moreover, in the high-power mode the control system can perform power curtailment by setting an active power reference smaller than an optimum power reference calculated by a maximum Cp tracking algorithm.

At block 825, the wind park controller determines whether the wind turbines should remain in the second mode of operation. For example, the wind park controller may keep the individual control systems in the high-power mode so long as the HVDC link is operational. If, however, the HVDC link is cut or an on-shore station is disconnected, at block 835 the wind park controller instructs the individual control systems to deactivate the PI controller and the reactive power adjustor and to switch to the first mode of operation. In one embodiment, the wind park controller monitors the output the wind turbines to determine if the voltage spikes (e.g., rises above a threshold) which leads to an overvoltage on the local AC grid 336. In response, the wind park controller can switch the wind turbines to the first mode to provide over voltage ride-through (OVRT) protection where the maximum voltage reference voltage is limited. Moreover, if an overvoltage is detected, the reference voltage can be reduced leading to a fast reduction of voltage on the local AC grid 336. In one embodiment, there is no need for communication between the control system in the turbines (i.e., the control systems do not need to be synchronized) when the control system switches from the second mode to the first mode. In one embodiment, the wind park controller can switch some of the wind turbines from the second mode to the first mode while the remaining wind turbines are shut down—i.e., no longer generate power.

However, if an overvoltage condition is not detected, the method 800 proceeds to block 830 where the wind turbines continue to transmit power on the HVDC link. In one embodiment, the control system described above does not need a PLL for normal operation. That is, when in the high-power mode, the control system does not use a traditional or discrete Fourier transform (DFT) based PLL to set the active and reactive power values used to control the output of the wind turbine. Further, the control systems in different wind turbines do not need to communicate with each other when operating in the high-power and island modes of operation which reduces cost and improves reliability. In addition, an uncontrolled diode rectifier can be a less expensive option for coupling the wind turbines to the HVDC link when compared to using alternative coupling systems that are controlled using digital signals.

Although the embodiments herein describe a central wind park controller that sends commands to the individual control systems of the wind turbines (e.g., commands to switch between the first and second modes, commands containing the desired active and reactive power values, power curtailment commands, etc.), the individual control systems can operate even if the communication link between the control system and the wind park controller is lost.

Figure 9:
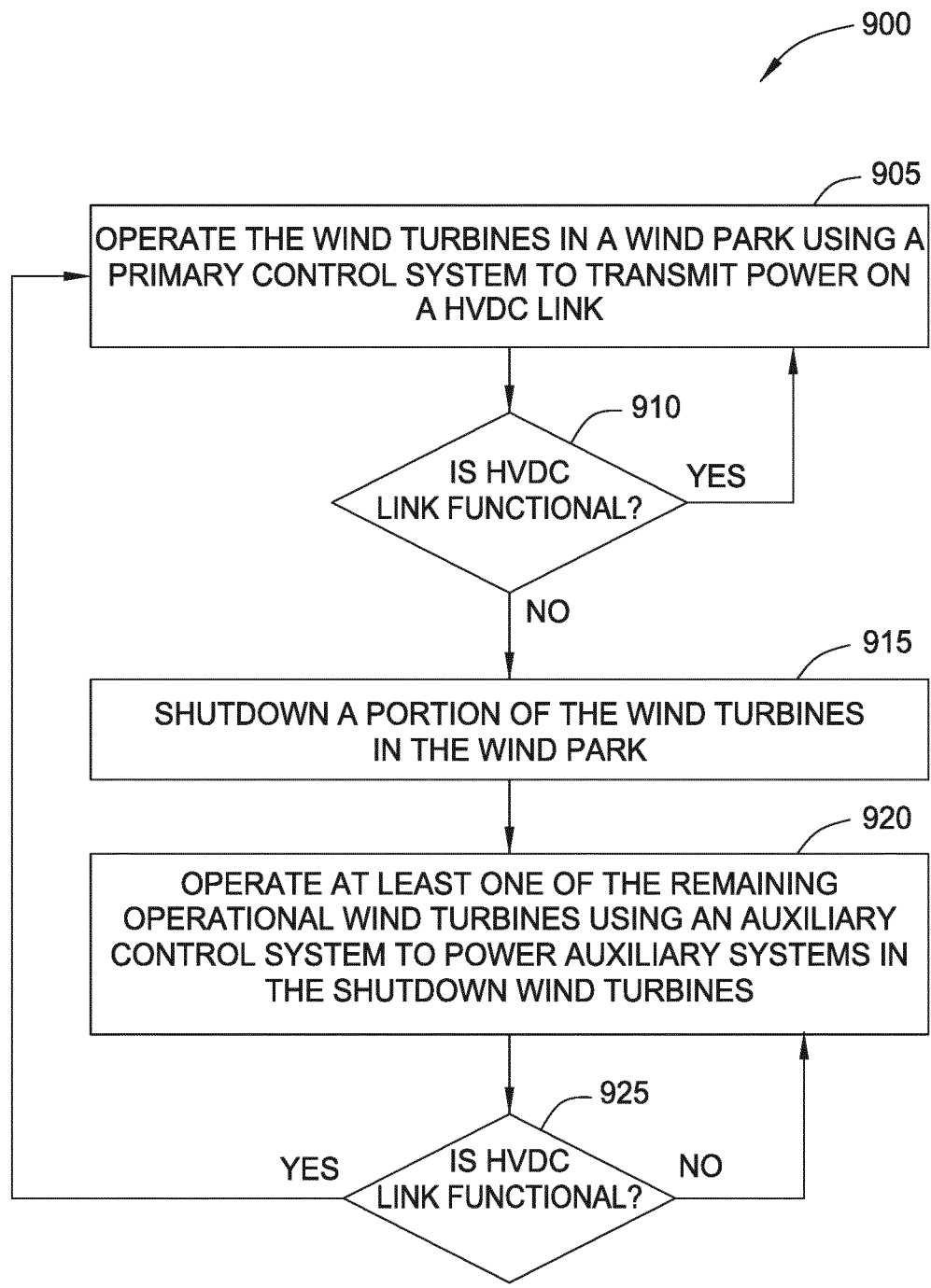
FIG. 9 is a flow chart for operating a wind turbine in different modes according to an embodiment described in this present disclosure.

FIG. 9 is a flow chart of a method 900 for operating a wind turbine in different modes according to an embodiment described in this present disclosure. The method 900 begins at block 905 where the wind turbines in a wind park (e.g., an off-shore wind park) are operated using a primary control system to transmit power on an HVDC link. In one embodiment, the wind turbines are coupled to a local AC grid 336 which is in turn coupled to an AC-DC converter and an HVDC link. As described above, the AC-DC converter can be an uncontrolled diode rectifier. However, in other embodiments, the AC-DC converter is a controlled rectifier which uses digital control signals from a wind park controller to convert AC power signals received from the wind turbines to determine the amount of DC power signal transmitted on the HVDC link. The AC-DC converter can be any type of converter that can transmit electrical power generated by a wind park onto a HVDC link.

Although the embodiments herein are described with an AC-DC converter coupled to a HVDC link, method 900 can also be used in a power system where the wind park is coupled to a high voltage alternating current (HVAC) link that is coupled to the wind park via an AC-AC converter.

At block 910, a wind park controller determines if the HVDC (or HVAC) link is functional. As discussed above, the HVDC link can be cut or an on-shore station can be disconnected thereby disconnecting the wind park from a primary grid (e.g., an on-shore grid). Moreover, the grid operator may voluntary decide to disconnect the HVDC link. Thus, the HVDC link is nonfunctional whenever the link is not energized, whether because of an accident (e.g., the line being cut or a grid fault) or intentional (e.g., the on-shore grid is not ready to connect to the wind park). If the HVDC link remains functional, method 900 returns to block 905. However, if the HVDC link is non-functional, method 900 proceeds to block 915 where the wind park controller shut downs a portion of the wind turbines in the wind park. As used herein, shutting down the wind turbines means that the wind turbines do not generate output power onto the local AC grid 336. However, other auxiliary systems in the wind turbines that are shutdown may still operate such as yawing motors, pumps, or heating elements for preventing ice buildup on the nacelle or blades.

At block 920, at least one of the remaining operational wind turbines in the wind park (i.e., a wind turbine that was not shutdown) uses an auxiliary control system to power auxiliary systems in the wind turbines that are shutdown. That is, at least one of the wind turbines in the park continues to output power on the local AC grid 336 (although no power is transmitted on the HVDC link). This power is received by the shutdown turbines which uses the power to operate their auxiliary systems. Doing so avoids having alternative energy sources in the wind park such as diesel or gas generators for powering the auxiliary systems in the wind turbines when the HVDC link is non-functional.

In one embodiment, the auxiliary control system used to operate the wind turbines during block 920 is similar to the control system 500 shown in FIG. 5 when the wind turbines are operating in the island mode when disconnected from the HVDC link. That is, the auxiliary control system generates power that is primarily dictated by the load (e.g., the power drawn by the auxiliary systems on the shutdown wind turbines) rather than a desired power provided by the turbine controller or the wind park controller.

At block 925, the wind park controller determines if the HVDC link is functional. If not, the method 900 returns to block 920. However, if the HVDC link is functional, the method 900 returns to block 905 where all the wind turbines in the wind park are operated using the primary control system and power is transmitted on the HVDC link. Put differently, when the HVDC link is again functional, the shutdown turbines are restarted and the wind turbines operating using the auxiliary control system are instead operated using the primary control system.

Figure 10:
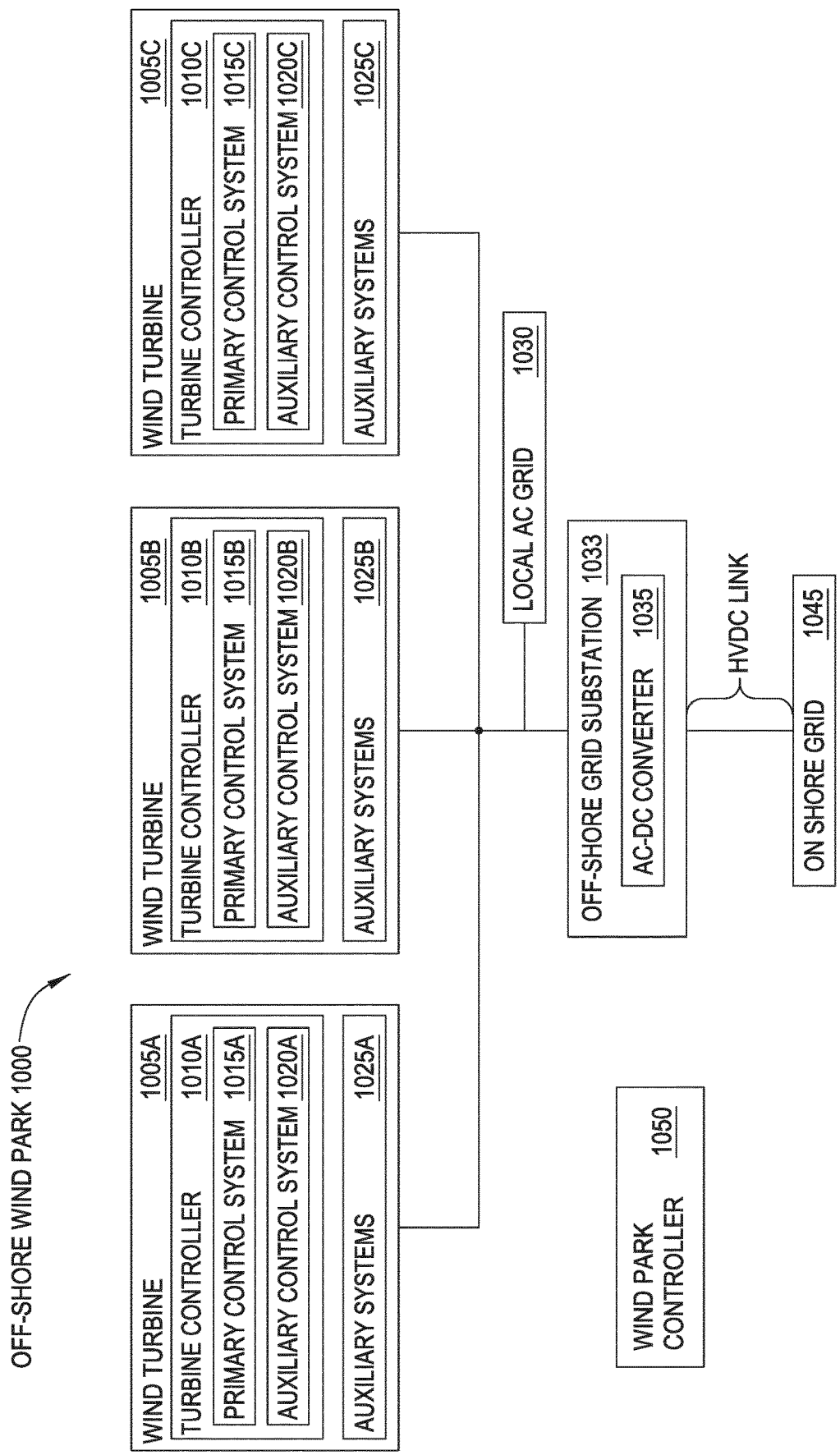
FIG. 10 is a block diagram of a wind park that includes at least one wind turbine that operates in different modes depending on the functionality of the HVDC link according to an embodiment described in this present disclosure.

FIG. 10 is a block diagram of a wind park 1000 that includes multiple wind turbine that operate in different modes depending on the functionality of the HVDC link according to an embodiment described in this present disclosure. In the example, the wind park 1000 is an off-shore wind park that is coupled to an on-shore grid 1045 via a HVDC link 1040. However, the embodiments below can also be applied to on-shore wind parks that use an HVDC link 1040 (or HVAC link) to transmit power to a distant grid.

The wind park 1000 includes three wind turbines 1005A, 1005B, and 1005C which each includes a turbine controller 1010 and auxiliary system 1025 (e.g., yaw controller/motors, pumps, deicing system, etc.). The turbine controllers 1010 have two separate control system that control the operation of the respective wind turbines 1005 depending on the functionality of the HVDC link 1040. As described in method 900 in FIG. 9, the turbine controllers 1010 use a primary control system 1015 when the HVDC link 1040 is functional which results in power being transmitted from the park 1000 to the on-shore grid 1045. However, when the HVDC link 1040 is non-functional, the wind park controller 1050 may instruct one or more of the turbine controllers 1010 to instead operate using an auxiliary control system 1020. For example, the three wind turbines 1005 shown here may be designated as back-up wind turbines in the park 1000 that provide power to the auxiliary systems 1020 of all the wind turbines in the park 1000 when the HVDC link 1040 is down. Put differently, all but the three turbines 1005 shown in FIG. 10 in the wind park 1000 may be shut down when the HVDC link is disabled. Instead of being shut down, the wind turbines 1005A, 1005B, and 1005C switch from operating using the primary control system 1015 to operating using the auxiliary control system 1020 which outputs a sufficient amount of power on a local AC grid 1030 (the reference 336 has been used to denote the local AC grid in FIGS. 3 and 4) to operate the auxiliary systems in the shutdown turbines as well as the auxiliary systems 1025A, 1025B, 1025C on the turbines 1005A, 1005B, and 1005C.

As shown, the wind turbines 1005 are coupled to the HVDC link 1040 via an off-shore grid substation 1033 that includes an AC-DC converter 1035. In one embodiment, the off-shore grid substation 1033 is disposed on a platform in the off-shore wind park 1000 and includes a structure that encloses the AC-DC converter 1035. However, in another embodiment, the off-shore grid substation 1033 and AC-DC converter 1035 may be disposed on the same platform but be contained within different enclosures. In either case, the AC-DC converter 1035 is used to convert the power on the local AC grid 1030 into DC power for transmission on the HVDC link 1040.

The AC-DC converter 1035 can be an uncontrolled converter or a controlled converter (e.g., either a self-commutated or an even line-commutated converters). For example, many current off-shore wind parks use a controlled converter to connect the turbines to an on-shore grid which is typically more expensive than the uncontrolled diode rectifier described above in FIG. 4. The control techniques recited in method 900 and shown in the wind park 1000 can be used regardless of the type of AC-DC converter 1035 used to couple the local AC grid 1030 to the HVDC link 1040. For example, the primary control system 1015 can be a control technique where the AC-DC converter 1035 is actively controlled by the wind park controller 1050. In one embodiment, the power outputted by the wind turbines 1005 when using the primary control system 1015 is determined by the AC-DC converter 1035. That is, the power outputted by the individual wind turbines 1005 may be dictated by the converter 1035 rather than from desired set points transmitted by, for example, the wind park controller 1050.

Alternatively, if the AC-DC converter 1035 is an uncontrolled diode rectifier as shown in FIG. 4, the primary control system 915 may be the high-power mode described above where the PI controller 565 and the reactive power adjuster 575 in FIG. 5 are activated to control the outputs of the individual wind turbines 1005. In this embodiment, the output of the wind turbines 1005 is controlled by desired set points rather than the AC-DC converter 1035.

In addition to providing auxiliary power to the shutdown wind turbines in the park 1000, the wind turbines 1005A-C may also provide power to the off-shore grid substation 1033 and the AC-DC converter 1035 when the HVDC link is non-functional. For example, the substation 1033 and the converter 1035 may include control systems and circuitry that can use the auxiliary power provided by the turbines 1005A-C to operate when there is not an active connection to the on shore grid 1045. Thus, the wind park 1000 may not need generators or battery systems to provide power to the grid substation 1033 and the converter 1035 when the HVDC link 1040 is not functional.

In one embodiment, the auxiliary control system 1020 and the primary control system 1015 are respective software applications or modules that execute depending on the status of the HVDC link. Thus, the wind park controller can instruct the individual turbine controllers to execute either the auxiliary control system 1020 or the primary control system 1015 depending on the status of the HVDC link. For example, the turbine controllers 1010 may include at least one processor and sufficient memory to store the software applications. However, in other embodiments, the auxiliary control system 1020 and the primary control system 1015 include hardware or firmware components.

Furthermore, although FIG. 10 illustrates coupling the wind park 1000 to a HVDC link, in another embodiment, the wind park 1000 is coupled to a HVAC link via an AC-AC converter which converts the AC power signals on the local AC grid 1030 to high-voltage AC power signals suitable for the HVAC link.

Figure 11:
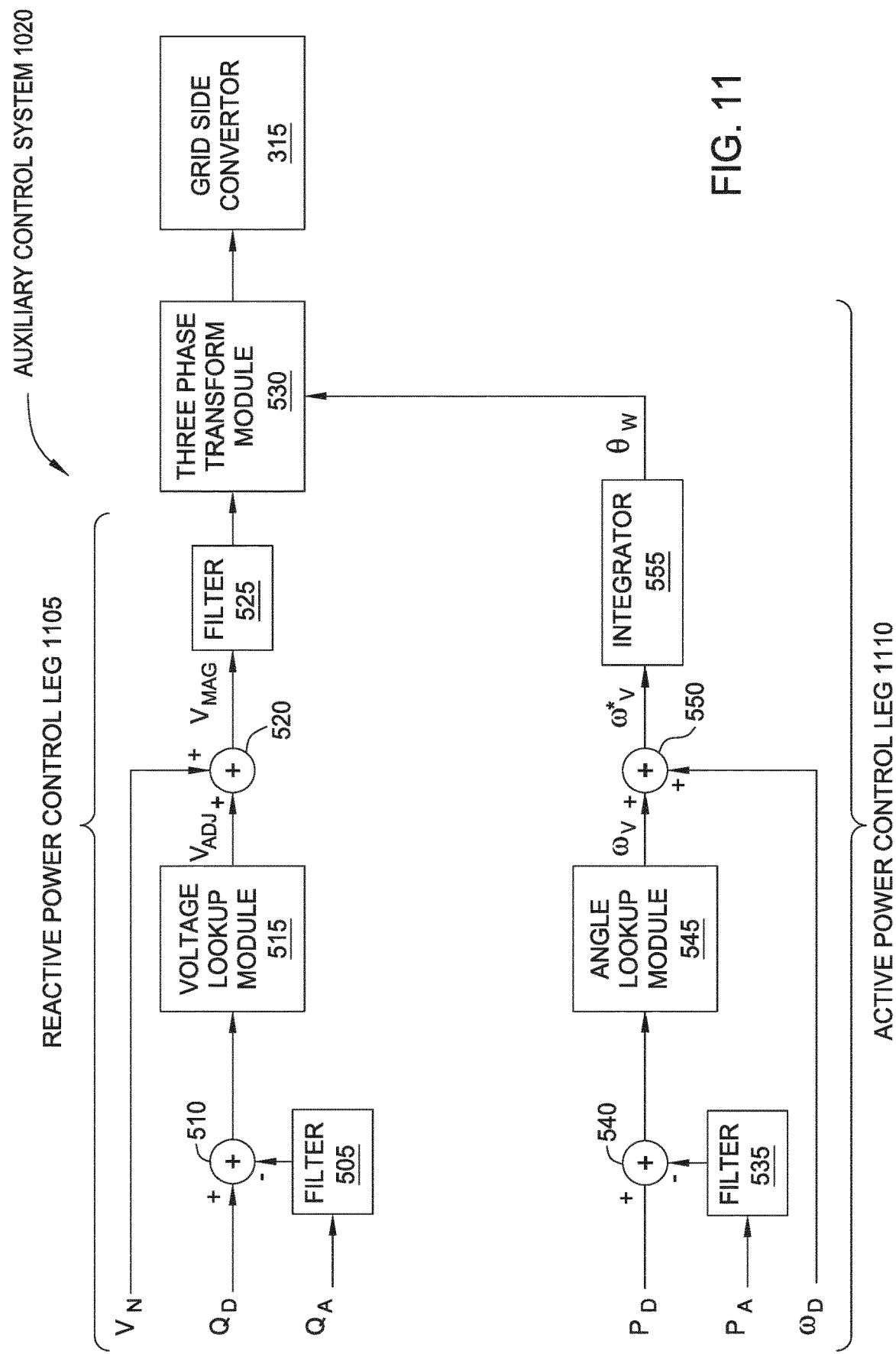
FIG. 11 illustrates an auxiliary control system used by a wind turbine with the HVDC link is non-functional according to an embodiment described in this present disclosure.

FIG. 11 illustrates an auxiliary control system 1020 used by a wind turbine with the HVDC link is non-functional according to an embodiment described in this present disclosure. The auxiliary control system 1020 is the same as the control system 500 in FIG. 5 except that the auxiliary control system 1020 does not include the PI controller 565, the reactive power adjuster 575, and the switches 560, 570. Put differently, the auxiliary control system 1020 includes the components used when the wind turbines operate in the island mode when the PI controller 565 and the reactive power adjuster 575 are deactivated.

As shown, the auxiliary control system 1020 includes a reactive power control leg 1105 and an active power control leg 1110. The various components in these legs 1105, 1110 operate in a same manner as the reactive power control leg 585 and the active power control leg 580 in FIG. 5 when the control system 500 is in the island mode. Thus, the functions of the legs 1105 and 1110 are not repeated here.

In the preceding, reference is made to embodiments presented in this disclosure. However, the scope of the present disclosure is not limited to specific described embodiments. Instead, any combination of the features and elements provided above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The present invention may be a system, a method, and/or a computer program product. The computer program product may include a computer-readable storage medium (or media) (e.g., a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) having computer readable program instructions thereon for causing a processor to carry out aspects of the present invention.

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the FIGS. illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A method, comprising:
   operating a wind turbine in a first mode to provide power to a local AC grid using a control system, wherein the control system comprises a reactive power control leg and an active power control leg; and
   switching operation of the wind turbine from the first mode to a second mode by activating a controller with an integral action to increase power output by the wind turbine thereby activating an uncontrolled diode rectifier, wherein the active power control leg is coupled to an input of the controller, wherein an output of the controller is coupled to the reactive power control leg, wherein the controller is active during the second mode but inactive during the first mode, and wherein, when in the second mode, the wind turbine transmits power through the local AC grid, and to a high-voltage direct current (HVDC) link coupled to the uncontrolled diode rectifier.

2. The method of claim 1, wherein, when in the second mode, the controller receives as an input a difference between a desired active power value and an actual active power value from the active power control leg and outputs a voltage adjustment for the reactive power control leg, wherein the controller comprises a proportional-integral (PI) controller.

3. The method of claim 2, further comprising:
generating a magnitude voltage in the reactive power control leg by combining the voltage adjustment outputted by the PI controller with a voltage derived from a difference between a desired reactive power value and an actual reactive power value.

4. The method of claim 1, wherein the active power control leg outputs a voltage factor angle and the reactive power control leg outputs a magnitude voltage, wherein the method further comprises:
generating control signals for a power converter in the wind turbine based on the voltage factor angle and the magnitude voltage, wherein the power converter outputs a three-phase AC signal.

5. The method of claim 1, wherein switching from the first mode to the second mode comprises:
activating a reactive power adjustor coupled between the reactive power control leg and the active power control leg, wherein the reactive power adjustor receives as an input a difference between a desired reactive power value and an actual reactive power value from the reactive power control leg and outputs an angle adjustment for the active power control leg.

6. The method of claim 5, further comprising:
generating a voltage factor angle in the active power control leg by combining the angle adjustment outputted by the reactive power adjustor with an angle derived from a difference between a desired active power value and an actual active power value.

7. The method of claim 5, wherein the reactive power adjustor equalizes a reactive power outputted by the wind turbine relative to reactive power outputted by other wind turbines coupled to the HVDC link, via the local AC grid.

8. A wind turbine, comprising:
a control system comprising:
a reactive power control leg,
an active power control leg, and
a controller with an integral action, wherein the active power control leg is coupled to an input of the controller, wherein an output of the controller is coupled to the reactive power control leg,
wherein the control system is configured to:
operate the wind turbine in a first mode to provide power to a local AC grid; and
switch operation of the wind turbine from the first mode to a second mode by activating the controller to increase power output by the wind turbine thereby activating an uncontrolled diode rectifier, wherein the controller is active during the second mode but inactive during the first mode, and wherein, when in the second mode, the wind turbine transmits power through the local AC grid, and to a high-voltage direct current (HVDC) link coupled to the uncontrolled diode rectifier.

9. The wind turbine of claim 8, wherein, when in the second mode, the controller receives as an input a difference between a desired active power value and an actual active power value from the active power control leg and outputs a voltage adjustment for the reactive power control leg, wherein the controller comprises a PI controller.

10. The wind turbine of claim 9, wherein the control system is configured to:
generate a magnitude voltage in the reactive power control leg by combining the voltage adjustment outputted by the PI controller with a voltage derived from a difference between a desired reactive power value and an actual reactive power value.

11. The wind turbine of claim 8, wherein the active power control leg outputs a voltage factor angle and the reactive power control leg outputs a magnitude voltage, wherein the control system is further configured to:
generate control signals for a power converter in the wind turbine based on the voltage factor angle and the magnitude voltage, wherein the power converter is configured to output a three-phase AC signal.

12. The wind turbine of claim 8, wherein the control system comprises:
a reactive power adjustor selectively coupled between the reactive power control leg and the active power control leg
wherein, when switching from the first mode to the second mode, the control system is configured to:
activate the reactive power adjustor, wherein the reactive power adjustor receives as an input a difference between a desired reactive power value and an actual reactive power value from the reactive power control leg and outputs an angle adjustment for the active power control leg.

13. The wind turbine of claim 12, wherein the control system is configured to:
generate a voltage factor angle in the active power control leg by combining the angle adjustment outputted by the reactive power adjustor with an angle derived from a difference between a desired active power value and an actual active power value.

14. The wind turbine of claim 12, wherein the reactive power adjustor is configured to equalize a reactive power outputted by the wind turbine relative to reactive power outputted by other wind turbines coupled to the HVDC link.

15. A control system for a wind turbine, comprising:
a processor; and
a memory configured to store a program, which when executed by the processor performs an operation, the operation comprising:
operating the wind turbine in a first mode to provide power to a local AC grid using the control system, wherein the control system comprises a reactive power control leg and an active power control leg; and
switching operation of the wind turbine from the first mode to a second mode by activating a controller with an integral action to increase power output by the wind turbine thereby activating an uncontrolled diode rectifier, wherein the active power control leg is coupled to an input of the controller, wherein an output of the controller is coupled to the reactive power control leg, wherein the controller is active during the second mode but inactive during the first mode, and wherein, when in the second mode, the wind turbine transmits power through the local AC grid, and to a high-voltage direct current (HVDC) link coupled to the uncontrolled diode rectifier.

16. The method of claim 1, further comprising:
upon determining that the HVDC link is non-functional, shutting down the wind turbine.

17. The method of claim 1, wherein the wind turbine powers an auxiliary system of a shut-down wind turbine when the HVDC link is non-functional, wherein the auxiliary system includes at least one of: a yawing motor, pump, or heating element.

18. The wind turbine of claim 8, the control system further configured to:
upon determining that the HVDC link is non-functional, shutting down the wind turbine.

19. The wind turbine of claim 8, wherein the wind turbine powers an auxiliary system of a shut-down wind turbine when the HVDC link is non-functional, wherein the auxiliary system includes at least one of: a yawing motor, pump, or heating element.

20. The control system of claim 15, the operation further comprising:
upon determining that the HVDC link is non-functional, shutting down the wind turbine.

\* \* \* \* \*